US009178761B2

United States Patent
Han et al.

(10) Patent No.: US 9,178,761 B2
(45) Date of Patent: Nov. 3, 2015

(54) PROVISIONING VPN PHONES

(71) Applicant: Avaya Inc., Basking Ridge, NJ (US)

(72) Inventors: Seung Bong Han, Tracy, CA (US); Thanh Phan, San Jose, CA (US)

(73) Assignee: Avaya Inc., Santa Clara, CA (US)

( * ) Notice: Subject to any disclaimer, the term of this patent is extended or adjusted under 35 U.S.C. 154(b) by 176 days.

(21) Appl. No.: 13/901,551

(22) Filed: May 23, 2013

(65) Prior Publication Data
US 2014/0348158 A1 Nov. 27, 2014

(51) Int. Cl.
*H04L 12/24* (2006.01)
*H04L 29/06* (2006.01)

(52) U.S. Cl.
CPC .......... *H04L 41/0806* (2013.01); *H04L 65/105* (2013.01); *H04L 65/1069* (2013.01)

(58) Field of Classification Search
CPC .............. H04L 41/0806; H04L 65/105; H04L 65/1069
See application file for complete search history.

(56) References Cited

U.S. PATENT DOCUMENTS

| | | | |
|---|---|---|---|
| 8,112,505 B1 * | 2/2012 | Ben-Shaul et al. ........... 709/219 |
| 2001/0029178 A1 | 10/2001 | Criss et al. |
| 2002/0057786 A1 | 5/2002 | Donovan et al. |
| 2003/0004895 A1 * | 1/2003 | Nuttall et al. .................... 705/67 |
| 2003/0093563 A1 * | 5/2003 | Young et al. ................... 709/245 |
| 2006/0230445 A1 | 10/2006 | Huang |
| 2009/0031368 A1 * | 1/2009 | Ling ............................... 725/87 |
| 2011/0276658 A1 * | 11/2011 | Massand ........................ 709/219 |
| 2012/0124384 A1 * | 5/2012 | Livni et al. .................... 713/178 |
| 2012/0124567 A1 | 5/2012 | Landry |
| 2012/0246221 A1 * | 9/2012 | Miyawaki ...................... 709/203 |
| 2013/0055234 A1 * | 2/2013 | Limbasia et al. .............. 717/173 |
| 2013/0249949 A1 * | 9/2013 | Pomerantz et al. ............ 345/641 |
| 2013/0262668 A1 * | 10/2013 | Shiga ............................. 709/224 |
| 2013/0275956 A1 | 10/2013 | Lai et al. |
| 2014/0052702 A1 | 2/2014 | Fierro et al. |

OTHER PUBLICATIONS

Office action for U.S. Appl. No. 14/033,446. May 15, 2015.

* cited by examiner

*Primary Examiner* — Brian D Nguyen

(57) ABSTRACT

Methods, systems and computer readable media for provisioning VPN phones are disclosed.

18 Claims, 11 Drawing Sheets

PROVISIONING VPN PHONES

TECHNICAL FIELD

Embodiments relate generally to computer network telecommunications, and more particularly, to methods, systems and computer readable media for provisioning virtual private network (VPN) phones.

BACKGROUND

In some conventional VPN phone environments, provisioning a VPN phone for a remote user (e.g., a user that is using the phone at a location away from a local area network (LAN) or wide-area network (WAN) network) can be cumbersome and time consuming. For example, an information technology (IT) administrator or network administrator may need to manually configure a VPN phone and send the phone to a remote worker (e.g., a telecommuting worker or teleworker). Alternatively, the IT department can develop a custom script or program in a corporate PC, which the teleworker uses to configure the phone by executing the program or script on the PC. In another alternative, the remote worker provisions the VPN phone using a document prepared by the IT department that contains instructions for provisioning the VPN phone. Each of the above provisioning techniques can be complex and difficult for a remote worker to perform or can be burdensome for the IT staff.

Embodiments were conceived in light of the above mentioned needs, problems and/or limitations, among other things.

SUMMARY

One or more embodiments can include methods, systems and computer readable media for provisioning VPN phones (or other computer network-based telecommunications equipment).

Some implementations can include a method comprising providing a proxy module at a gateway system, wherein the proxy module is configured to facilitate automatic provisioning of a VPN phone. The method can also include receiving, at the proxy module of the gateway system, a first request from the VPN phone and providing a first file in response to the first request. The method can further include receiving, at the proxy module of the gateway system, a second request from the VPN phone and providing a second file in response to the second request. The method can also include configuring the VPN phone based on the second file.

The method can further include connecting the VPN phone to a call server subsequent to the configuring. The method can also include rebooting the VPN phone subsequent to the configuring. The method can further include sending a gatekeeper request message from the VPN phone to the call server.

Some implementations can include a system comprising one or more processors configured to perform operations. The operations can include providing a proxy module at a gateway system, wherein the proxy module is configured to facilitate automatic provisioning of a VPN phone. The operations can also include receiving, at the proxy module of the gateway system, a first request from the VPN phone and providing a first file in response to the first request. The operations can further include receiving, at the proxy module of the gateway system, a second request from the VPN phone and providing a second file in response to the second request. The operations can also include configuring the VPN phone based on the second file.

The operations can further include connecting the VPN phone to a call server subsequent to the configuring. The operations can also include rebooting the VPN phone subsequent to the configuring. The operations can further include sending a gatekeeper request message from the VPN phone to the call server.

Some implementations can include a nontransitory computer readable medium having stored thereon software instructions that, when executed by a processor, cause the processor to perform operations. The operations can include providing a proxy module at a gateway system, wherein the proxy module is configured to facilitate automatic provisioning of a VPN phone. The operations can also include receiving, at the proxy module of the gateway system, a first request from the VPN phone and providing a first file in response to the first request. The operations can further include receiving, at the proxy module of the gateway system, a second request from the VPN phone and providing a second file in response to the second request. The operations can also include configuring the VPN phone based on the second file.

The operations can further include connecting the VPN phone to a call server subsequent to the configuring. The operations can also include rebooting the VPN phone subsequent to the configuring. The operations can further include sending a gatekeeper request message from the VPN phone to the call server.

DETAILED DESCRIPTION

Some implementations can include the use of a VPN gateway, such as the Avaya VPN Gateway (AVG), as a registration authentication service proxy between a remote VPN phone and a backend or core server. The VPN gateway can provide an initial configuration to the VPN phone and then connect the phone through to the core server to obtain an updated configuration.

The VPN gateway can be configured to support a subset of H.323 RAS messages and act as an H.323 Gatekeeper. Also, the VPN gateway can host initial phone configuration files as an HTTP/HTTPS server.

Figure 1:
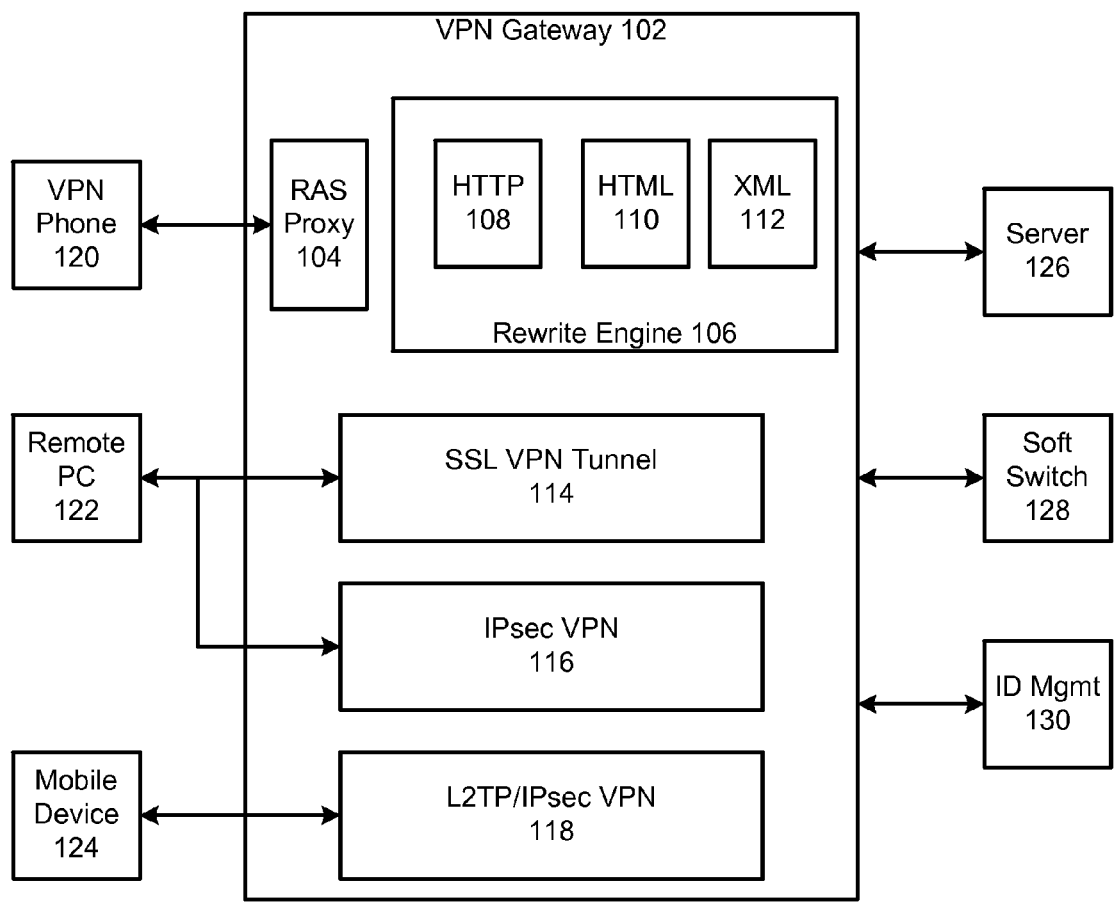
FIG. 1 is diagram of an example VPN phone environment in accordance with at least one implementation.

FIG. 1 is diagram of an example VPN phone environment 100. The environment 100 can include a VPN gateway 102. The VPN gateway 102 has a registration, admission, status (RAS) proxy 104. The VPN gateway 102 also has a rewrite engine 106 including an HTTP module 108, an HTML module 110 and an XML module 112. The VPN gateway 102 also includes an SSL VPN tunnel 114, an IPSec VPN 116 and an L2TP/IPSec VPN.

In operation, a VPN phone 120 can connect to a server 126, soft switch 128 or ID management system 130 via the RAS proxy 104 of the VPN gateway 102. The connection between the VPN phone 120 can the RAS proxy 104 can include an H.323/IPSec connection. A remote PC 122 can connect via the SSL VPN tunnel 114 and/or the IPSec VPN 116. A mobile device 124 can connect via the L2TP/IPSec VPN 118.

Figure 2:
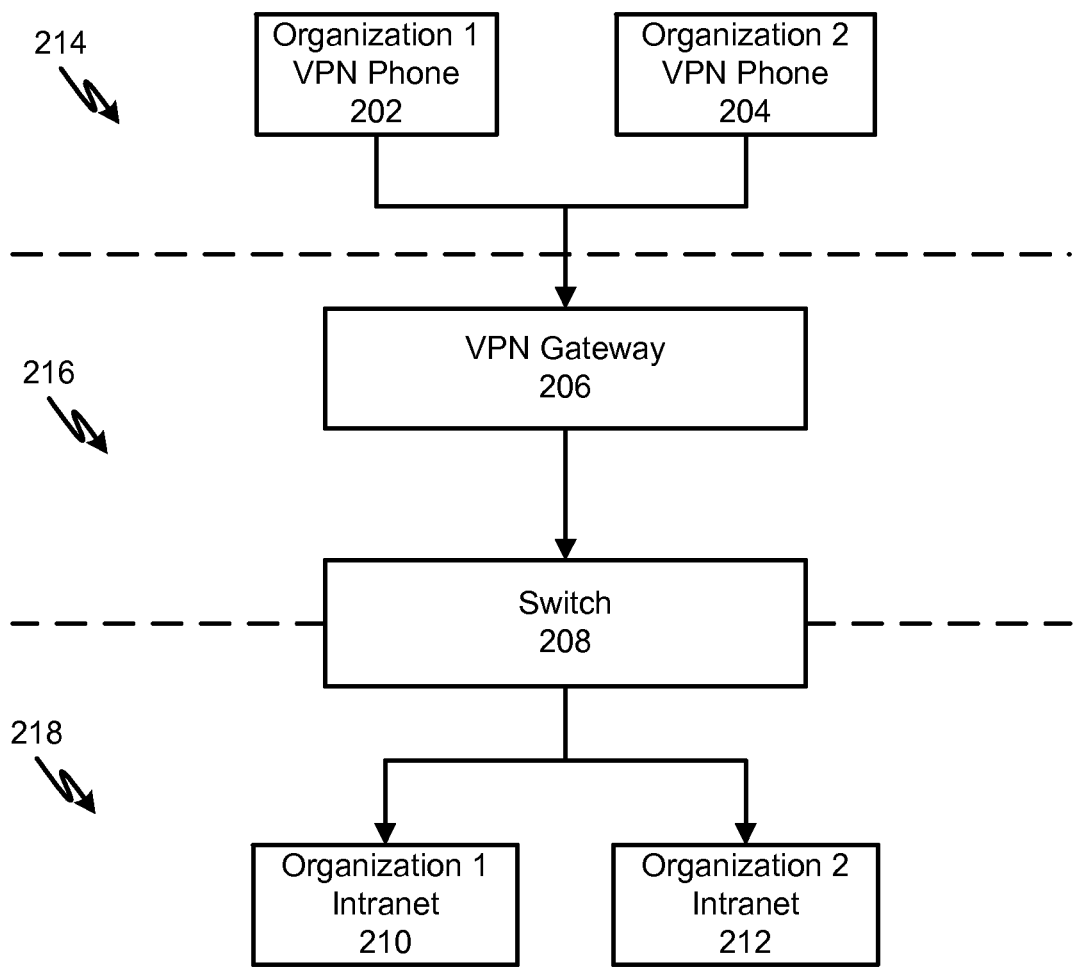
FIG. 2 is a diagram of an example VPN phone environment showing organization intranet connections in accordance with at least one implementation.

FIG. 2 is a diagram of an example VPN phone environment 200 that includes a VPN phone 202 associated with a first organization and a VPN phone 204 associated with a second organization. The VPN phones (202 and 204) connect to a VPN gateway 206 and, in turn, to a switch 208. The switch 208 connects each phone (202, 204) to a respective intranet 210 and 212. The intranets (2210 and 212) can each include a domain names server, a telecommunications platform and an IP telephony system.

The environment 200 includes an internet portion 214, a managed network zone 216 and a private network zone 218.

Figure 3:
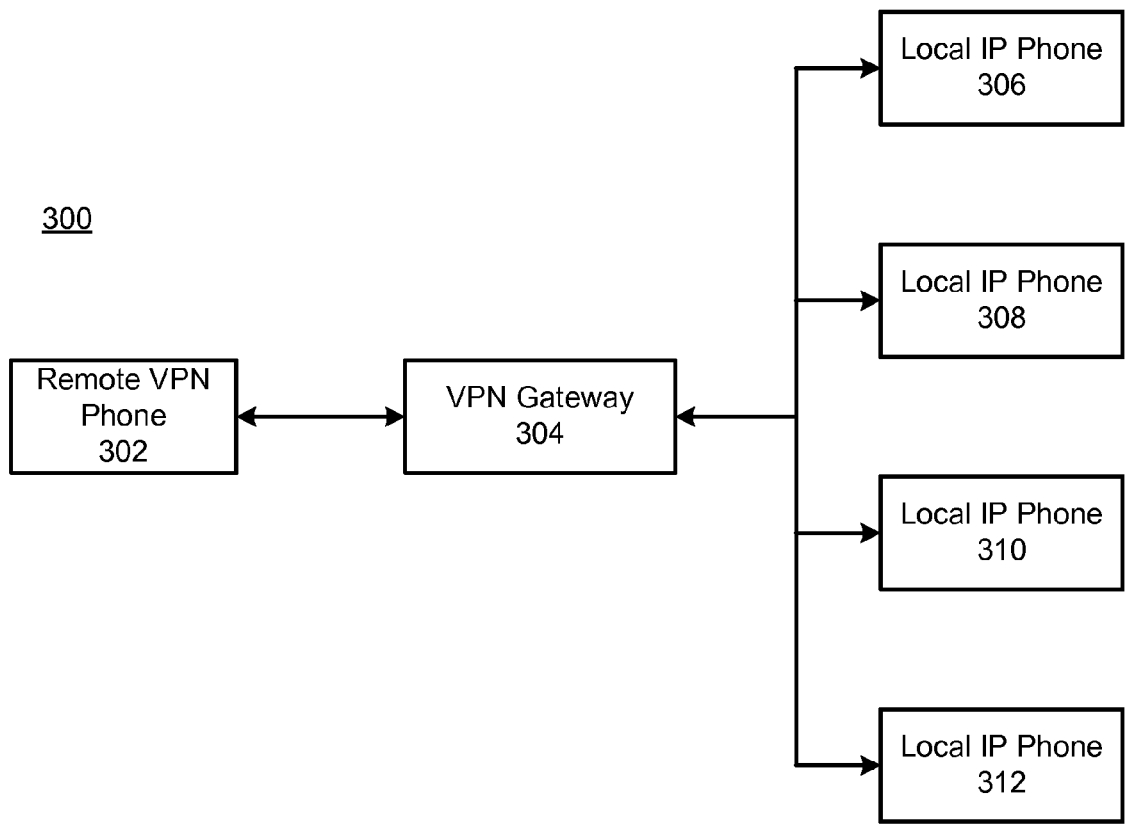
FIG. 3 is a diagram of an example VPN phone environment in accordance with at least one implementation.

FIG. 3 is a diagram of an example VPN phone environment 300 that includes a remote VPN phone 302, a VPN gateway 304 and a plurality of local IP phones (306-312).

In operation, the VPN gateway 304 can provide automatic provisioning over the Internet including protocols such as H.323 and IPSec. The VPN gateway 304 can be located within an enterprise cloud. The local IP phones (306-312) can connect with the VPN gateway 304 via an SSL connection or the like.

Figure 4:
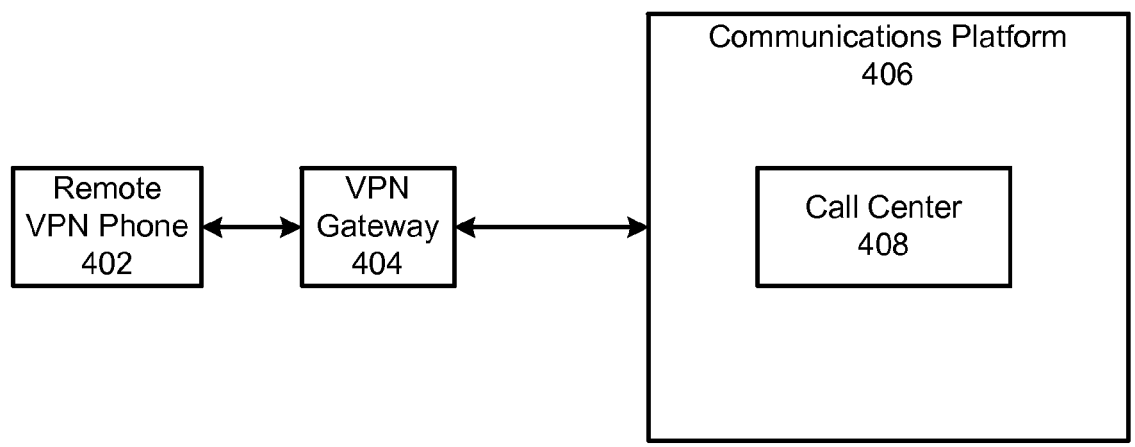
FIG. 4 is a diagram of an example VPN phone environment in accordance with at least one implementation.

FIG. 4 is a diagram of an example VPN phone environment 400 that includes a remote VPN phone 402, a VPN gateway 404 and a communications platform 406. The communications platform 406 includes a call center 408.

Figure 5:
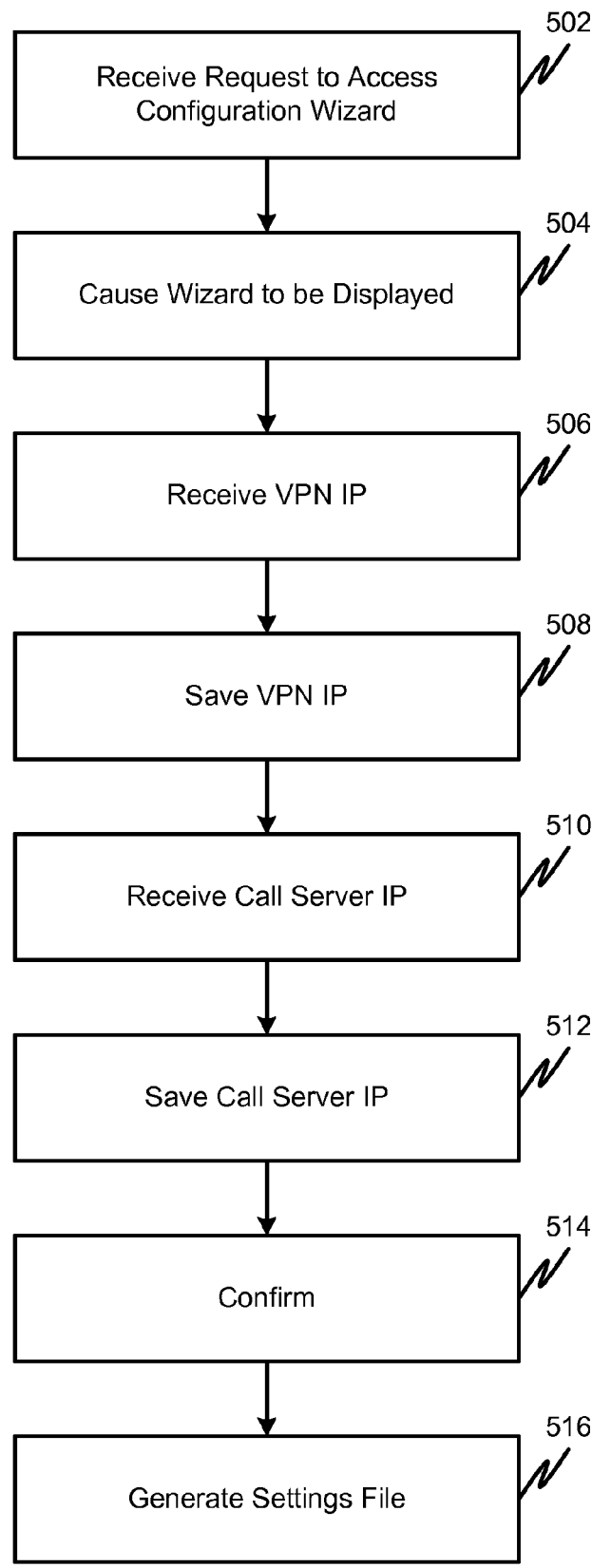
FIG. 5 is a flow chart of an example method for VPN phone provisioning in accordance with at least one implementation.

FIG. 5 is a flow chart of an example method for VPN phone provisioning in accordance with at least one implementation. Processing beings at 502, where a request to access a configuration wizard is received. Processing continues to 504.

At 504, a wizard is caused to be displayed. Processing continues to 506.

At 506, a VPN internet protocol address (IP address) is received. Processing continues to 508.

At 508, the VPN IP is saved. Processing continues to 510.

At 510, a call server IP is received. For example, the IP address of a call server within the intranet is received. Processing continues to 512.

At 512, the call server IP address is saved. Processing continues to 514.

At 514, the IP address(es) are confirmed. Processing continues to 516.

At 516, the settings file for the VPN phone is generated.

Figure 6:
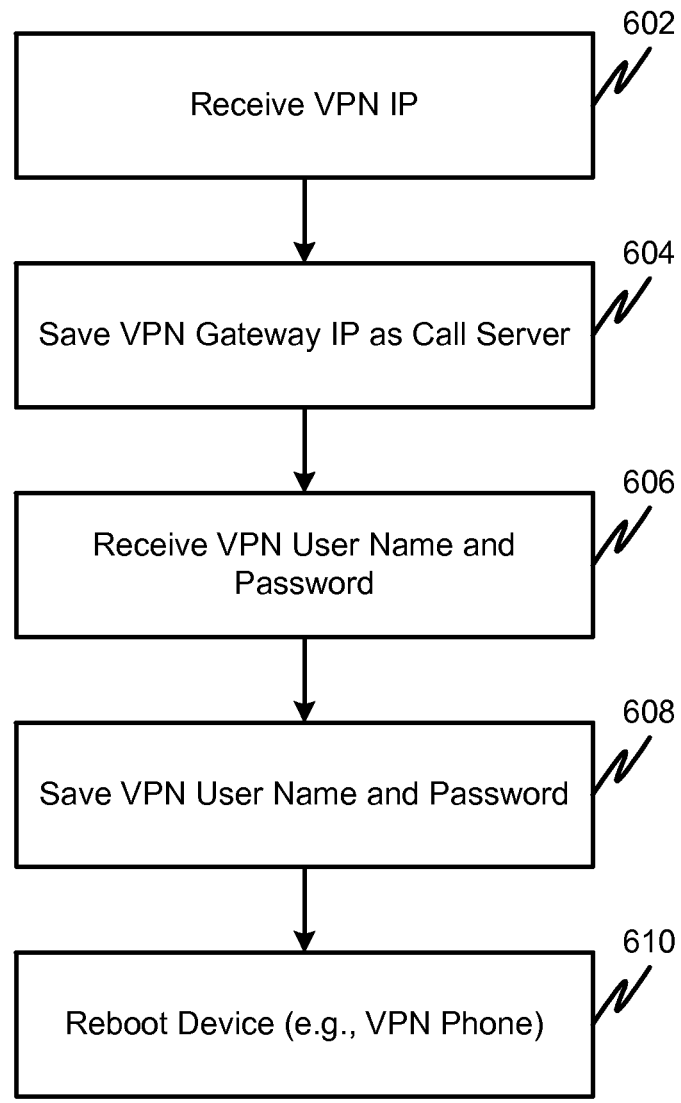
FIG. 6 is a flow chart of an example method for VPN phone provisioning in accordance with at least one implementation.

FIG. 6 is a flow chart of an example method for VPN phone provisioning. Processing begins at 602, where a VPN IP is received. Processing continues to 604.

At 604, the VPN gateway IP address is saved as the call server address. Processing continues to 606.

At 606, a VPN user name and password are received. Processing continues to 608.

At 608, the VPN user name and password are saved. Processing 610.

At 610, the device (e.g., the VPN phone) is rebooted.

Figure 7:
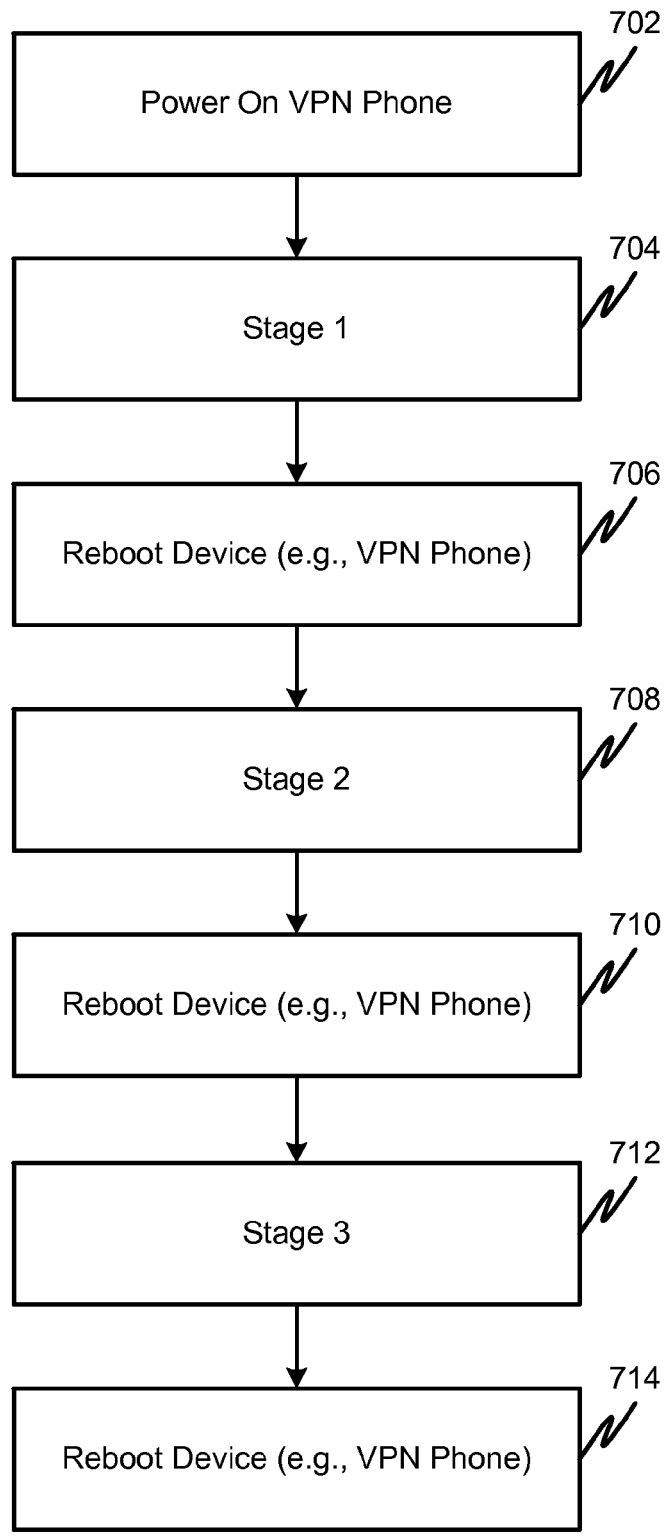
FIG. 7 is a flow chart of an example method for VPN phone provisioning in accordance with at least one implementation.

FIG. 7 is a flow chart of an example method for VPN phone provisioning. Processing begins at 702, where a VPN phone is powered on. Processing continues to 704.

At 704, stage 1 of the automatic provisioning process is performed. Stage 1 is described in greater detail below in connection with FIG. 8. Processing continues to 706.

At 706, the device is rebooted. Processing continues to 708.

At 708, stage 2 of the automatic provisioning process is performed. Stage 2 is described in greater detail below in connection with FIG. 9. Processing continues to 710.

At 710, the device is rebooted. Processing continues to 712.

At 712, stage 3 of the automatic provisioning process is performed. Stage 3 is described below in greater detail in connection with FIG. 10. Processing continues to 714.

At 714, the device is rebooted.

Figure 8:
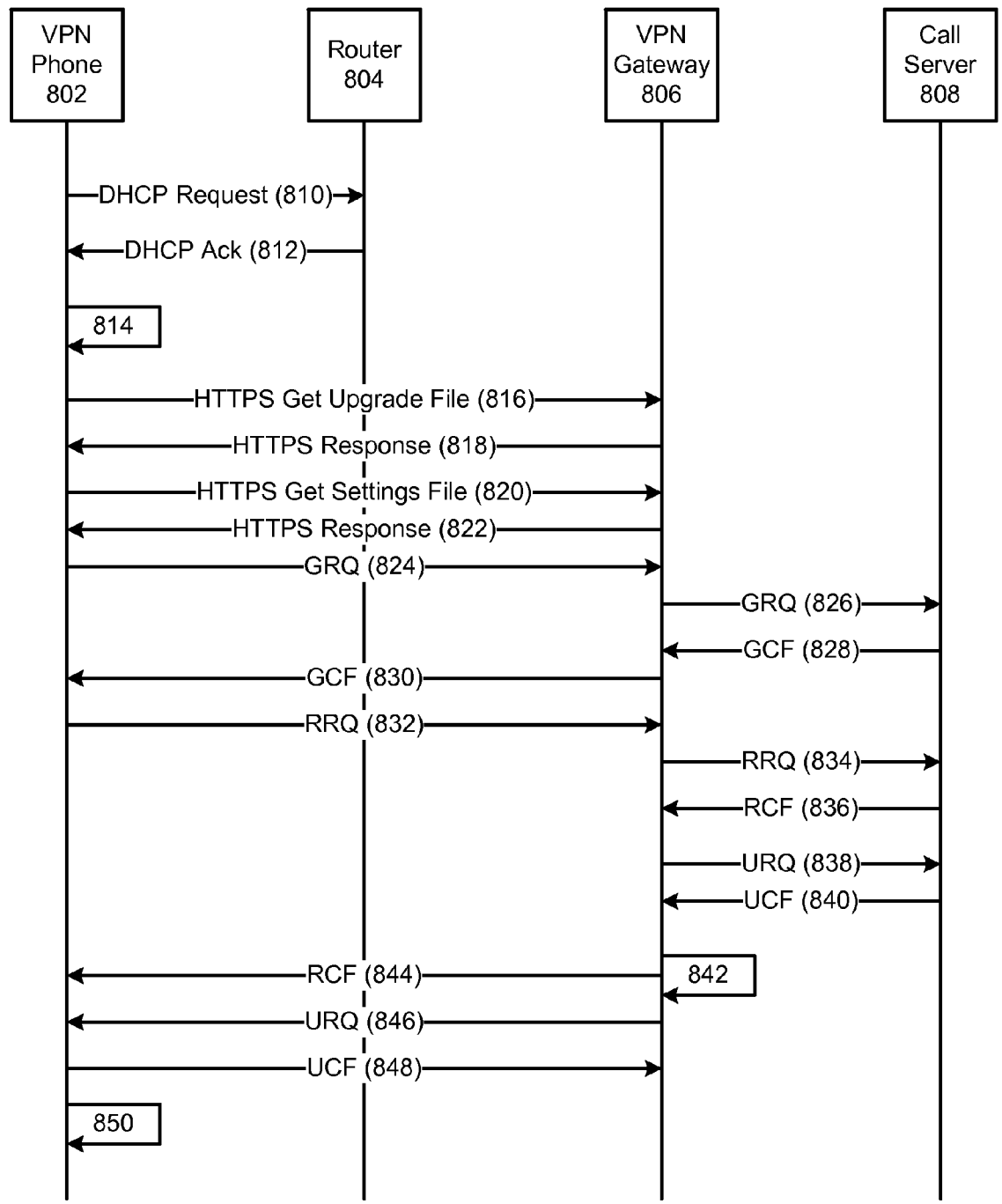
FIG. 8 is a data/control flow diagram of an example method for VPN phone provisioning in accordance with at least one implementation.

FIG. 8 is a data/control flow diagram of an example method for VPN phone provisioning in accordance with at least one implementation. Messages are transferred between a VPN phone 802, a router 804 (e.g., a home router), a VPN gateway 806 and an intranet 808.

The VPN phone sends a dynamic host configuration protocol (DHCP) message 810 to the router 804. The router 804 responds with a DHCP acknowledge message 812.

At 814, the VPN phone 802 provides a craft menu (e.g., a configuration menu) and receives a configuration of a VPN as a call server. At 816, the VPN phone 802 sends an HTTPS get message to the VPN gateway 806. The VPN gateway 806 responds 818 with the upgrade file for the VPN phone 802 if the phone is authenticated. If the phone 802 is not authenticated, the VPN gateway may not respond, but the phone will continue with the sequence.

At 820, the VPN phone 802 sends an HTTPS get message for the settings file. At 822, the VPN gateway 806 responds with the settings file, if the phone is authenticated. If the phone 802 is not authenticated, the VPN gateway may not respond, but the phone will continue with the sequence. At 824, the VPN phone 802 sends a GRQ message 824 to the VPN gateway 806. The VPN gateway 806 sends a GRQ message 826 to the call server in the intranet 808.

The call server responds with a GCF message 828. The VPN gateway 806 sends a CGF message 830 to the VPN phone 802. The VPN phone 802 sends an RRQ message 832 to the VPN gateway 806. The VPN gateway 806 forwards the RRQ message 834 to the call server 808.

The call server responds with an RCF message 836. The VPN gateway sends a URQ message 838 to the call server and receives a UCF message 840 from the call server. At 442, the remote user is authorized to access the HTTP server. An RCF message 844 is sent form the VPN gateway 806 to the VPN phone 802.

At 846 a URQ message 846 is sent from the VPN gateway 806 to the VPN phone 802. At 848, the VPN phone responds with a UCF message 848. At 850 the VPN phone is auto-rebooted.

Figure 9:
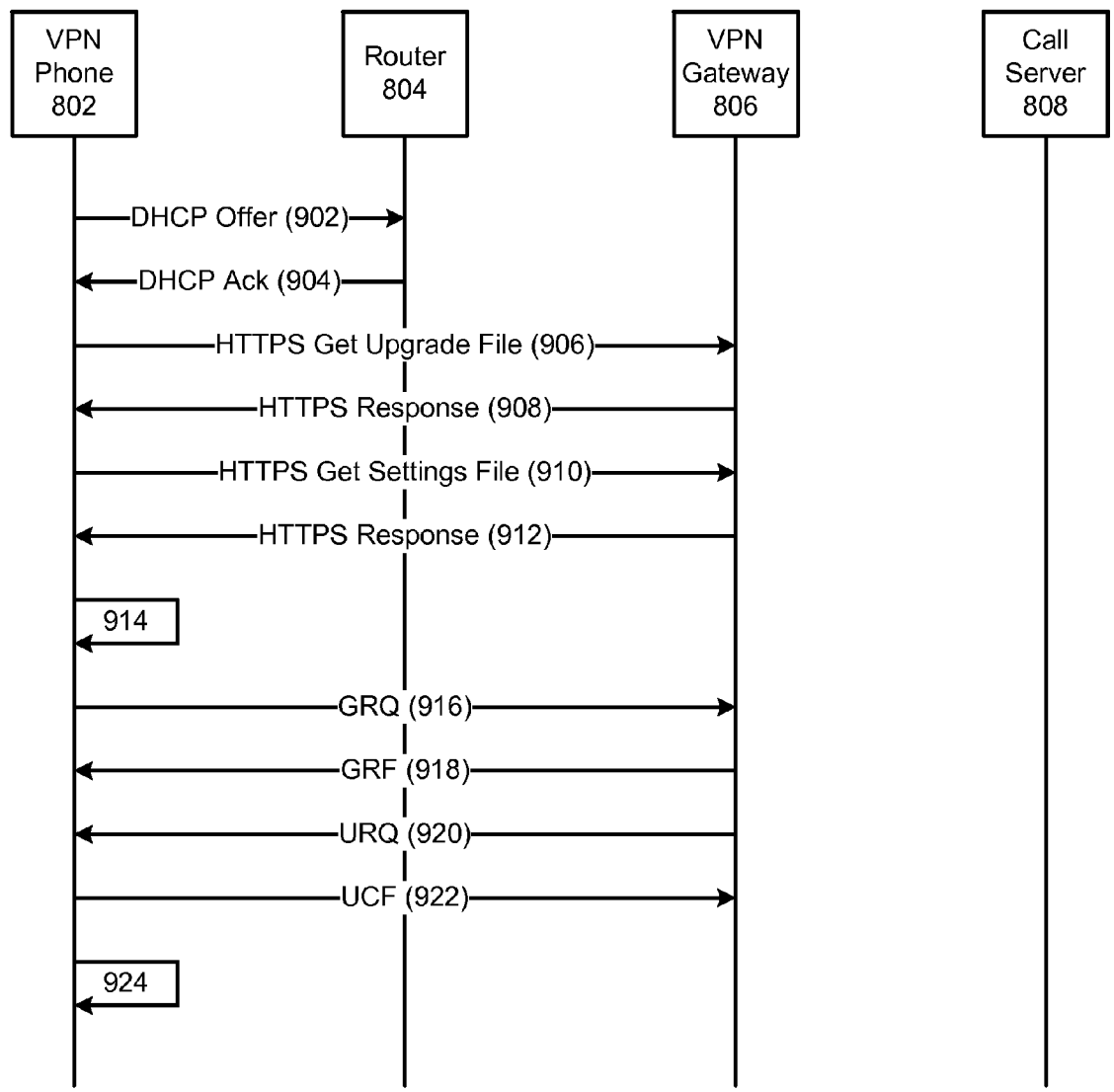
FIG. 9 is a data/control flow diagram of an example method for VPN phone provisioning in accordance with at least one implementation.

FIG. 9 is a data/control flow diagram of an example method for VPN phone provisioning. The VPN phone 802 sends a DHCP offer 902 to the router 804. The router 804 responds with a DHCP acknowledgement 904.

The VPN phone 802 sends an HTTPS get message 906 for the upgrade file. The VPN gateway (e.g., via the RAS proxy) responds 908 with the upgrade file. The VPN phone 802 then sends an HTTPS get message 910 for the settings file. The VPN gateway 806 responds with the settings file 912.

At 914, the VPN phone 802 is configured using the settings file received from the VPN gateway 806. At 916, the VPN phone 802 sends a GRQ message 916 to the VPN gateway 806. The VPN gateway 806 responds with a GRF message 918.

The VPN gateway 806 then sends a URQ message 920 to the VPN phone 802. The VPN phone 802 responds with a UCF message 922. At 924 the VPN phone 802 performs an auto-reboot.

Figure 10:
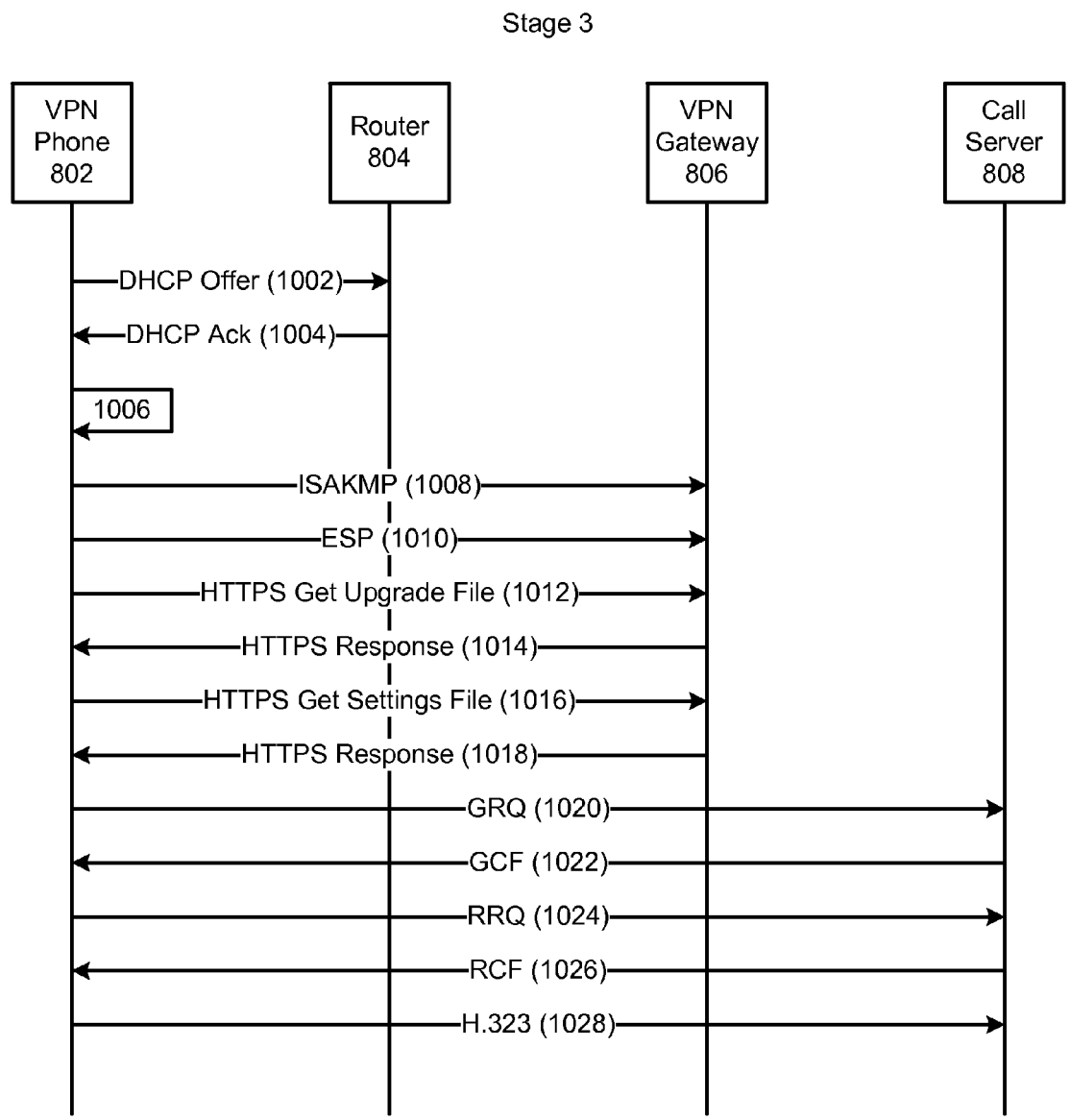
FIG. 10 is a data/control flow diagram of an example method for VPN phone provisioning in accordance with at least one implementation.

FIG. 10 is a data/control flow diagram of an example method for VPN phone provisioning. The VPN phone 802 sends a DHCP offer 1002 to the router 804. The router 804 responds with a DHCP acknowledgement 1004.

At 1006, the VPN phone 802 provides a craft menu (e.g., a configuration menu) and receives a configuration of a VPN user ID and password. At 1008, the VPN phone 802 sends an ISAKMP message 1008. At 1010, the VPN phone 802 sends an ESP message to the VPN gateway 806.

At 1012, the VPN phone 802 sends an HTTPS get message for the upgrade file to the VPN gateway 806. The VPN gateway 806 (e.g., via the RAS proxy) responds 1014 with the upgrade file. The VPN phone 802 then sends an HTTPS get message 1016 for the settings file. The VPN gateway 806 responds with the settings file 1018.

At 1020, the VPN phone 802 sends a GRQ message to the call server 808. At 1022, the call server responds with a GCF message.

The VPN phone 802 then sends an RRQ message 1024 to the call server 808. The call server 808 responds with an RCF message 1026. At 1028, an H.323 connection is established between the VPN phone 802 and the call server 808.

Figure 11:
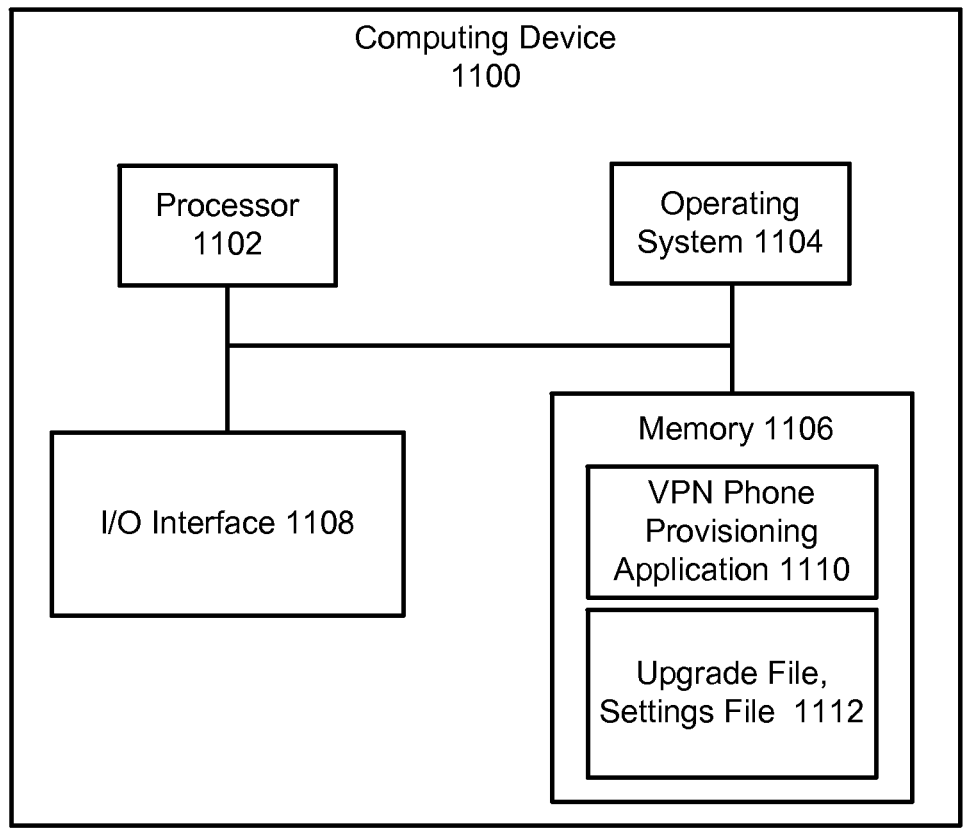
FIG. 11 is a diagram of an example computer system in accordance with at least one implementation.

FIG. 11 is a diagram of an example computer system. The computer 1100 includes a processor 1102, operating system 1104, memory 1106 and I/O interface 1108. The memory 1106 can include a VPN provisioning application 1110 and files 1112 for configuring a VPN phone.

In operation, the processor 1102 may execute the application 1110 stored in the memory 1106. The application 1110 can include software instructions that, when executed by the processor, cause the processor to perform operations for network management in accordance with the present disclosure (e.g., performing one or more of the steps described above in connection with FIGS. 5-10).

The application program 1110 can operate in conjunction with the files 1112 and the operating system 1104.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking/telecommunications arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for provisioning VPN phones.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
providing a proxy module at a gateway system, wherein the proxy module is configured to facilitate automatic provisioning of a VPN phone;
receiving, at the proxy module of the gateway system, a first request from the VPN phone and providing a first file in response to the first request;
receiving, at the proxy module of the gateway system, a second request from the VPN phone after providing the first file, and providing a second file in response to the second request,
wherein the VPN phone is configured for communication with a call server based on the second file;
connecting the VPN phone to the call server subsequent to the configuring; and
sending a request message from the VPN phone to the call server.

2. The method of claim 1, further comprising rebooting the VPN phone subsequent to the configuring.

3. The method of claim 1, wherein the request message is a gatekeeper request message from the VPN phone to the call server.

4. The method of claim 1, wherein the first file is an upgrade file and the second file is a settings file.

5. The method of claim 1, further comprising using a gateway IP address of the proxy module as an address of the call server for the VPN phone.

6. The method of claim 1, further comprising receiving, at the proxy module, a user name and password from the VPN phone to permit access to the call server.

7. A system comprising:
a storage device; and
one or more processors configured to perform operations including:
providing a proxy module at a gateway system, wherein the proxy module is configured to facilitate automatic provisioning of a VPN phone;
receiving, at the proxy module of the gateway system, a first request from the VPN phone and providing a first file in response to the first request;
receiving, at the proxy module of the gateway system, a second request from the VPN phone after providing the first file, and providing a second file in response to the second request,
wherein the VPN phone is configured for communication with a call server based on the second file;
connecting the VPN phone to the call server subsequent to the configuring; and
sending a request message from the VPN phone to the call server.

8. The system of claim 7, wherein the operations further comprise rebooting the VPN phone subsequent to the configuring.

9. The system of claim 7, wherein the request message is a gatekeeper request message from the VPN phone to the call server.

10. The system of claim 7, wherein the first file is an upgrade file and the second file is a settings file.

11. The system of claim 7, wherein the operations further comprise using a gateway IP address of the proxy module as an address of the call server for the VPN phone.

12. The system of claim 7, wherein the operations further comprise receiving, at the proxy module, a user name and password from the VPN phone to permit access to the call server.

13. A nontransitory computer readable medium having stored thereon software instructions that, when executed by a processor, cause the processor to perform operations including:
providing a proxy module at a gateway system, wherein the proxy module is configured to facilitate automatic provisioning of a VPN phone;
receiving, at the proxy module of the gateway system, a first request from the VPN phone and providing a first file in response to the first request; and
receiving, at the proxy module of the gateway system, a second request from the VPN phone after providing the first file, and providing a second file in response to the second request,
wherein the VPN phone is configured for communication with a call server based on the second file;
connecting the VPN phone to the call server subsequent to the configuring; and
sending a request message from the VPN phone to the call server.

14. The nontransitory computer readable medium of claim 13, wherein the operations further comprise rebooting the VPN phone subsequent to the configuring.

15. The nontransitory computer readable medium of claim 13, wherein the request message is a gatekeeper request message from the VPN phone to the call server.

16. The nontransitory computer readable medium of claim 13, wherein the first file is an upgrade file and the second file is a settings file.

17. The nontransitory computer readable medium of claim 13, wherein the operations further comprise using a gateway IP address of the proxy module as an address of the call server for the VPN phone.

18. The nontransitory computer readable medium of claim 13, wherein the operations further comprise receiving, at the proxy module, a user name and password from the VPN phone to permit access to the call server.

* * * * *